United States Patent [19]

Samuel

[11] 3,778,711
[45] Dec. 11, 1973

[54] DAMPING CLUTCH FOR INDICATING METER
[75] Inventor: Trevor Samuel, Rochester, Ill.
[73] Assignee: Sangamo Electric Company, Springfield, Ill.
[22] Filed: Apr. 14, 1972
[21] Appl. No.: 243,979

Related U.S. Application Data
[63] Continuation of Ser. No. 853,152, Aug. 26, 1969, abandoned.

[52] U.S. Cl. ............................ 324/125, 324/103 R
[51] Int. Cl. ........................ G01r 1/14, G01r 19/16
[58] Field of Search ............... 324/125, 103, 103 P; 116/129 R, 129 B; 73/430; 188/90 A

[56] References Cited
UNITED STATES PATENTS
| | | | |
|---|---|---|---|
| 2,518,928 | 8/1950 | Paine et al. | 116/129 |
| 2,424,689 | 7/1947 | Hamill | 324/103 |
| 713,497 | 11/1902 | Rowland | 188/90 |
| 2,531,948 | 11/1950 | Road | 324/103 |
| 2,607,548 | 8/1952 | Hollander | 188/90 |

FOREIGN PATENTS OR APPLICATIONS
| | | | |
|---|---|---|---|
| 586,887 | 11/1959 | Canada | 324/125 |

Primary Examiner—Rudolph V. Rolinec
Assistant Examiner—Ernest F. Karlsen
Attorney—John A. Dienner et al.

[57] ABSTRACT

A maximum demand indicator for use with an electrical demand meter and the like including a damping clutch having a substantially closed chamber enclosing a clutch disc mounted on a rotatable pivot pin supporting a balanced indicating pointer movable in response to the maximum electrical load measured. A damping compound is disposed within the chamber which effects a low retarding force on the disc during slow movement of the pointer and effects a substantially greater retarding force on the clutch disc when the pointer is subjected to shock, vibration or other extraneous forces.

3 Claims, 3 Drawing Figures

PATENTED DEC 11 1973 3,778,711

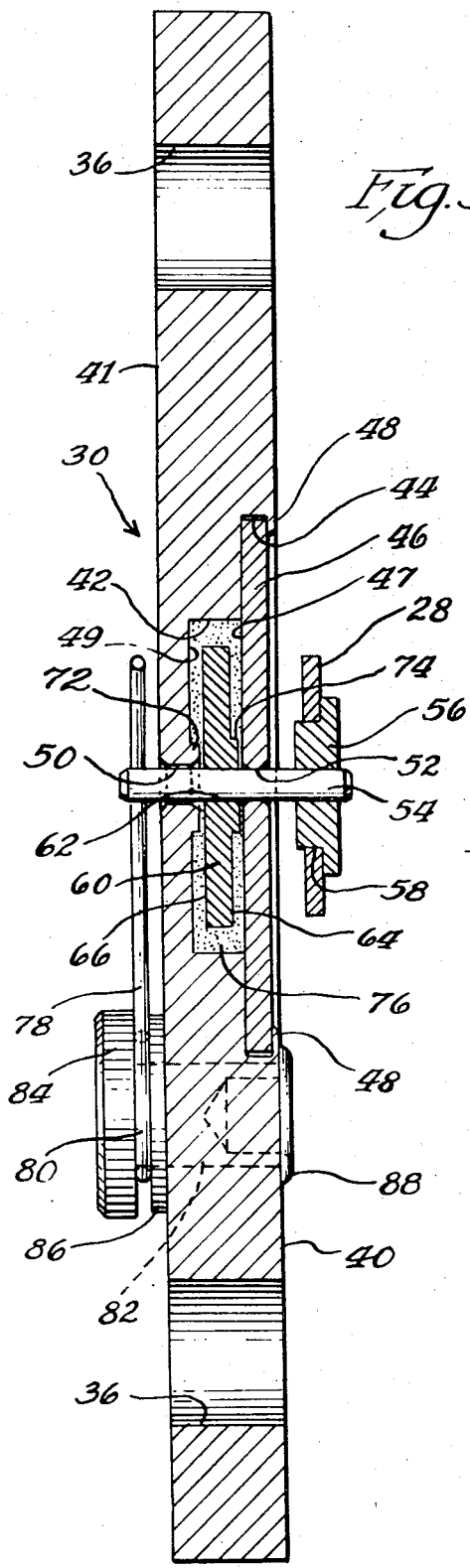
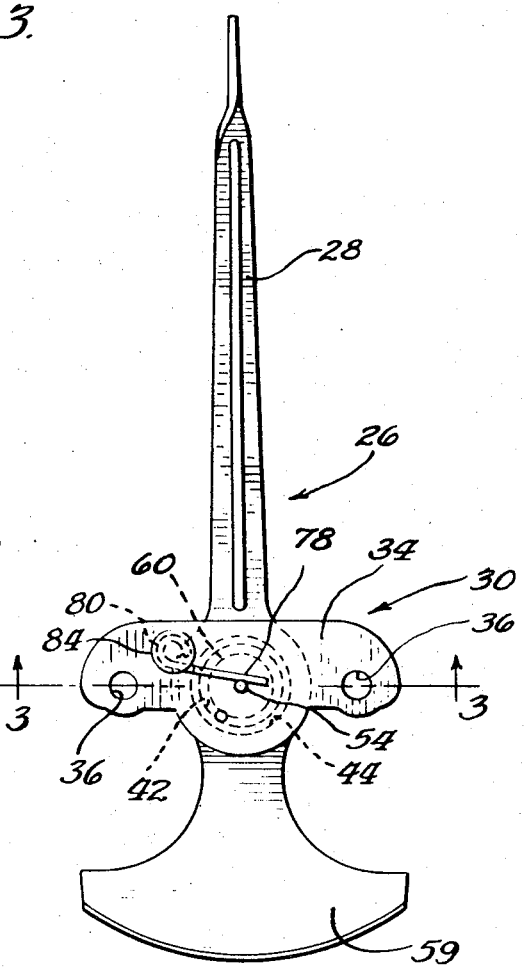
Fig. 3.
Fig. 2.

DAMPING CLUTCH FOR INDICATING METER

This application is a continuation of my earlier filed application, Ser. No. 853,152, now abandoned filed Aug. 26, 1969.

BACKGROUND OF THE INVENTION

The present invention relates generally to damping clutches, and more specifically to a damping clutch particularly suited for use with a maximum demand pointer on a demand meter and the like.

In the manufacture and use of a demand meter for measuring electric loads connected across the meter, it is conventional to utilize an indicator pointer responsive to the average electric load across the meter. In conjunction with the average load responsive indicating pointer, it is also known to use a maximum demand indicating pointer cooperable with the load responsive pointer for movement to a position indicating the maximum electric load measured. Such maximum demand indicators generally have damping clutch mechanisms associated with them which are adapted to maintain the maximum demand pointers in the maxmum positions to which they have been moved by the average load responsive pointers until the meters are read, at which time the maximum demand pointers are returned to positions generally coincident with the positions of the corresponding average load responsive pointers.

The known maximum demand indicator pointers have, in general, employed clutch mechanisms of substantially open face design such as that disclosed in U.S. Pat. No. 2,518,928. The efficiency and operation of these known damping clutch mechanisms is dependent upon the formulation of the damping compound employed. For the open face type damping clutch mechanism to be successful, the compound must not only exhibit considerable resiliency, but must also have thixotropic properties which prevent the compound from flowing out of the damping compound chamber, a problem which has prevented the maximum demand indicators of known design from maintaining the desired damping characteristics throughout the lives of the demand meters with which they are used. There thus exists a need for a damping clutch adapted to maintain the desired damping characteristics throughout the life of the meter or other device with which it is used irrespective of the varying environmental conditions to which the device is subjected.

SUMMARY OF THE INVENTION

One of the primary objects of the present invention is to provide a damping clutch for use with maximum demand indicator pointers and the like, which damping clutch allows an indicator pointer to be moved slowly with low retarding force but exhibits a substantially greater retarding force to substantially prevent movement of the pointer when it is subjected to shock, vibration or other extraneous forces.

Another object of the present invention is to provide a damping clutch for use with the maximum demand pointer of a demand meter and the like, which damping clutch makes possible the use of standard low cost damping compounds and maintains the desired damping characteristics throughout the life of the instrument with which it is used.

Another object of the present invention is to provide a damping clutch as described employing a clutch disc received within a substantially totally enclosed chamber having a damping compound therein which cannot flow out of the chamber and which can be selected for its damping qualities without reference to any thixotropic requirements.

In carrying out the objects and advantages of my invention, I provide a mounting plate having a recess therein and a cover plate secured thereto to define a substantially closed chamber within the recess. A pair of axially aligned bearing apertures intersect the chamber and rotatably support a pivot pin having a balanced indicator pointer mounted thereon externally of the chamber. A circular clutch disc is supported on the pivot pin within the enclosed chamber and contacts a damping compound confined within the chamber. The damping compound is effective to apply a low retarding force on the clutch disc and allow slow movement of the pointer under low applied torque but applies greater retarding force on the clutch disc to substantially prevent movement thereof when the pointer is subjected to shock, vibration or other sudden extraneous forces.

Further objects and advantages of my invention, together with the organization and manner of operation thereof, may best be understood by reference to the following description taken in connection with the accompanying drawings, in the several figures of which like reference numerals identify like elements.

BRIEF DESCRIPTION OF THE DRAWINGS

FIG. 2 is an enlarged front view of the maximum demand indicator assembly of FIG. 1; and FIG. 3 is an enlarged section view taken generally along the line 3—3 of FIG. 2, looking in the direction of the arrows.

BRIEF DESCRIPTION OF A PREFERRED EMBODIMENT

Figure 1:
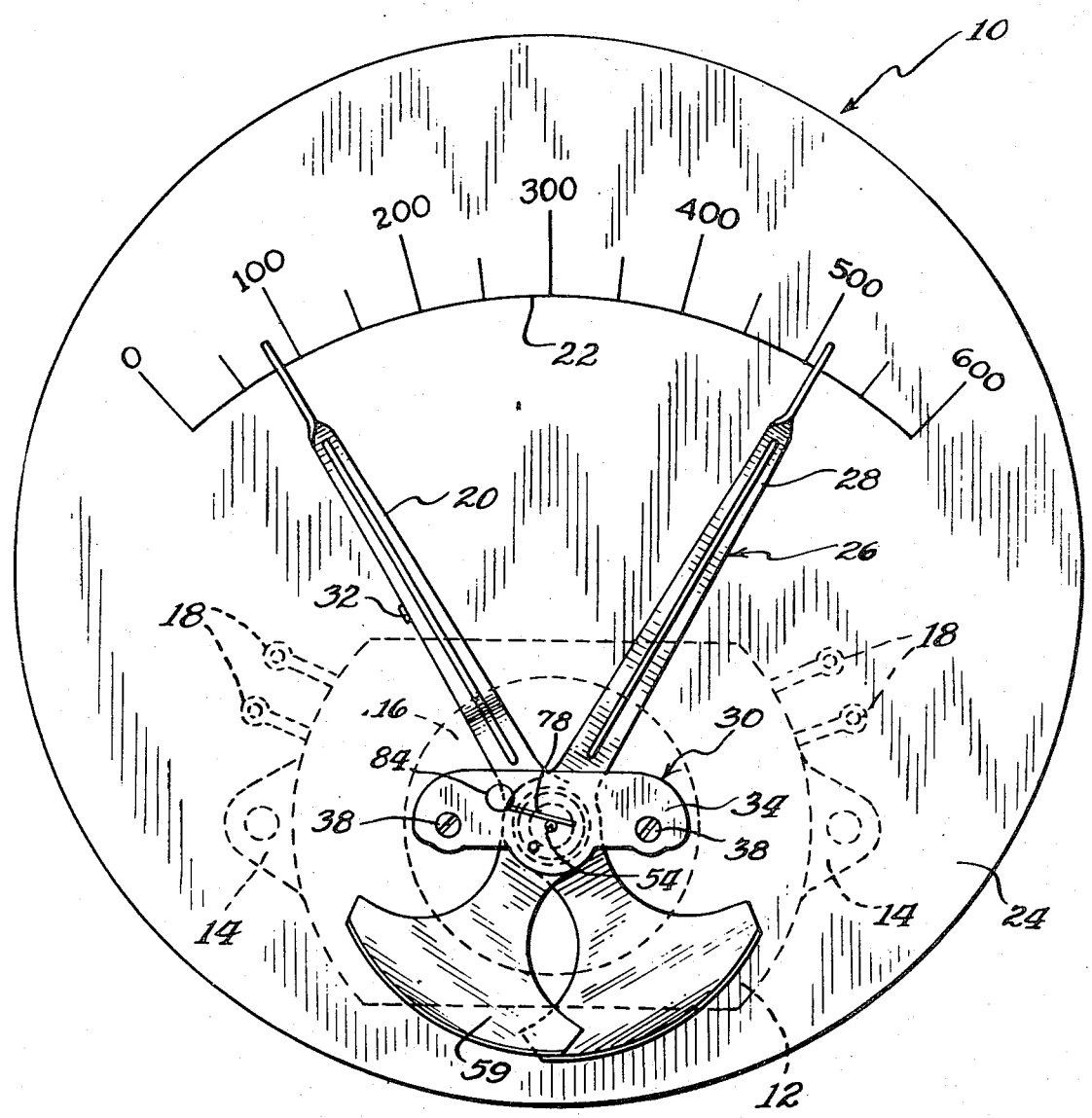
FIG. 1 is a front view of an indicating instrument showing an application of the present invention, a thermal demand meter being chosen as illustrative of the type of indicating instrument with which the present invention may be readily used.

Referring now to the drawings, and in particular to FIG. 1, I have illustrated my invention, by way of example, as being embodied in a thermal demand meter, indicated generally at reference numeral 10. The thermal demand meter 10 is of known construction, except for the maximum demand indicator means to be explained more fully hereinbelow, and includes first indicator means responsive to an electric load connected across the meter for measuring the average electric load. The first indicator means includes a thermal measuring element 12 suitably secured to a frame structure (not shown) through bolt flanges 14. The thermal measuring element 12 comprises a pair of conventional axially aligned bimetal coils 16, one of which serves as a driving coil and the other of which serves as a retarding coil. Conventional heating elements are provided for each of the theraml responsive bimetal coils 16, each of the heating elements having heater terminals 18 adapted for suitable connection to an electric circuit which it is desired to meter.

The bimetal coils 16 have their inner ends secured to a drive shaft (not shown) disposed in axial relation through the coils in a known manner. The drive shaft serves to support a balanced pusher pointer 20 which rotates with the drive shaft in response to the magnitude of the electric load being measured such that deflection of the pusher pointer 20 is proportional to the electric load being measured. The outer end of the indicator pointer 20 overlies a graduated scale 22 provided on a face plate 24, the scale being calibrated to indicate the measured load in kilowatts, volts, amperes or other quantities. The face plate 24 is supported by the demand meter frame in normal relation to the drive shaft of pointer 20 between the pointer and the thermal measuring element 12 in a known manner. A more detailed description of a thermal measuring element 12 which may be used in the thermal demand meter 10 is provided in U.S. Pat. No. 1,944,656.

The thermal demand meter 10 includes maximum demand indicator means, indicated generally at 26. The maximum demand indicator means 26 includes a maximum demand pointer 28 adapted to be freely moved in the direction of increasing electric load when subjected to a slowly applied low torque, and adapted to remain in the position indicating the maximum electric load measured by the pusher pointer 20 during any given period of meter measuring. The maximum demand indicator means 26 further includes damping clutch assembly means, indicated generally at 30, which supports the demand pointer 28 on the front surface of the face plate 24. As will become more apparent hereinbelow, the damping clutch assembly means 30 supports the maximum demand pointer 28 such that the maximum demand pointer is selectively responsive to movement of the pusher pointer 20 in the direction of increasing electric load, and maintains the demand pointer in the maximum position attained when the maximum demand pointer is subjected to shock, vibration and other sudden extraneous forces during a load measuring or metering period. The pusher pointer 20 has an outwardly directed tab 32 thereon adapted to engage the near edge of the demand pointer 28 and move the demand pointer in the direction of increasing electric load whenever the pusher pointer responds to an average load of greater magnitude than any previously measured load during the measuring period.

Referring to FIGS. 2 and 3, taken in conjunction with FIG. 1, the damping clutch assembly means 30 includes a housing comprising a mounting plate or bridge body portion 34 having a pair of apertures 36 therethrough to receive suitable mounting bolts 38 for securing the mounting plate 34 to the outer surface of the face plate 24. It will be understood that the face plate 24 has outwardly directed or raised boss portions adjacent the bolt apertures 36 of the mounting plate 34 so that the mounting plate will be spaced outwardly from the plane of the face plate 24 to provide spatial clearance for the pusher pointer 20 and the maximum demand pointer 28. The mounting plate 34 may be made from generally flat stock having parallel planar surfaces 40 and 41. A stepped recess defined by cylindrical bores 42 and 44 is formed in the mounting plate 34, the bore 44 intersecting the planar surface 40 of the mounting plate. A circular flat cover plate 46 having a diameter slightly less than the diameter of the cylindrical bore 44 is received within the bore 44 with a planar surface 47 abutting against the annular shoulder between bores 42 and 44 and is secured therein by suitable means such as staking at 48. A pair of axially aligned bearing apertures 50 and 52 are provided in the mounting plate 34 and cover plate 46, respectively, with the axis of the aligned bearing apertures being coincident with the center axis of the cylindrical bores 42 and 44. With the cover plate 46 secured within the bore 44, a chamber is formed within the mounting plate 34 defined by the circular peripheral surface of bore 42, the inner surface 47 of cover plate 46, and a planar end surface 49 in the mounting plate bore 42. The surfaces 47 and 49 are parallel and lie in planes normal to the axis of bore 42 and bearing apertures 50 and 52.

The bearing apertures 50 and 52 rotatably receive and support a cylindrical pivot pin 54 having end portions extending outwardly from the surfaces 40 and 41 of the mounting plate 34. A circular hub 56 is secured on the end of pin 54 outwardly of mounting plate surface 40 and has an annular shoulder 58 thereon to fixedly receive and support the demand pointer 28. For this purpose, the demand pointer 28 has an aperture therethrough to receive the shoulder 58, the pointer being thereafter staked onto the hub. The diameters of the pivot pin 54 and bearing apertures 50 and 52 are made as small as possible, while maintaining good manufacturing practices, to reduce bearing friction to a minimum and allow free rotation of the pivot pin.

The demand indicator pointer 28 is balanced about the pivot pin 54 to prevent the pointer from establishing moments about its rotational axis which would tend to bias the pointer during movement thereof. To this end, the demand pointer 28 has a fan shaped end portion 59 of a size and weight to counter-balance the pointer end opposite the pivot pin 54 so that the pointer is substantially balanced about the pivot axis of the pivot pin.

The pivot pin 54 has a generally flat circular clutch disc 60 suitably secured thereon in normal relation to the axis of the pivot pin for rotation with the pivot pin. The clutch disc 60 is fully received within the chamber of bore 42 and has a diameter less than the diameter of the cylindrical bore 42 within the mounting plate 34. The disc 60 has a center aperture 62 to receive the pivot pin 54 therethrough in a force fit, and has a width, when considered in section as shown in FIG. 3, such that parallel planar surfaces 64 and 66 thereon are spaced inwardly from the planar surfaces 47 and 49, respectively, defining the chamber within the mounting plate 34. The mounting plate 34 has an annular shoulder 72 raised outwardly from the surface 49 adjacent the bearing aperture 50 to ensure a minimum clearance or spacing between the clutch disc surface 66 and the surface 49. the clutch disc 60 has a similar annular shoulder 74 raised outwardly from surface 64 to ensure a minimum clearance or spacing between the clutch disc surface 64 and the inner surface 47 of the cover plate 46. With the clutch disc 60 secured on the pivot pin 54 through a force fit, and the cover plate 46 staked within the bore 42 of the clutch body 34, the clutch disc 60 serves to maintain the pivot pin 54 in generally fixed axial relation within the mounting plate 34. Similarly, with the cover plate 46 secured to the mounting plate 34 and the pivot pin 54 rotationally received within the bearing apertures 50 and 52, a substantially closed chamber is formed within the mounting plate which totally encloses the clutch disc 60.

The above-described chamber within the mounting plate 34 contains a damping compound 76 which contacts the exposed surfaces 64 and 66 of the clutch disc 60. The damping compound 76 is preferably silicone grease of suitable viscosity and is present within the chamber in an amount sufficient to occupy approximately about one-half to about three-fourths of the volume of the clutch chamber about the clutch disc 60. It has been found that the clutch chamber within the mounting plate 34 should not be completely filled with the silicone grease damping compound because expansion of the damping compound at high temperatures may force some of the compound outwardly between the bearing apertures 50 and 52 and the pivot pin 54. The damping compound 76 used in the clutch chamber is selected such that its rheological properties characterize the compound as non-newtonian in nature. The effective viscosity of the damping compound 76 is dependent upon the rate of shear. At shear rates substantially greater than those encountered in normal moving of the demand pointer 28 by the indicator pusher pointer 20, such as shear rates resulting from shock, vibration or other sudden extraneous forces acting on the pointer 28, forces other than tangential shear forces are established within the damping compound. These forces tend to increase the apparent viscosity of the damping compound and are exerted in a direction essentially normal to the plane of shear such that they tend to separate the damping compound and the clutch disc at their contacting interface. If means are not provided to prevent separation of the two clutch surfaces, that is, the contacting surfaces of the damping compound and the clutch disc 60, the effective retarding forces of the clutch are reduced until eventually, if movement of the clutch disc is fast enough, the damping compound shears and no damping is accomplished. With the substantially closed damping compound chamber of the mounting plate 30, such separation at the damping compound-disc surface interface is prevented and the damping and clutch characteristics are maintained throughout the life of the demand meter irrespective of the varying extraneous forces to which the pointer 28 is subjected.

A friction wire 78 is supported on the mounting plate 34 adjacent the surface 41 in a manner to frictionally engage an outer end portion of the pivot pin 54 extending outwardly from the surface 41 of the mounting plate. The friction wire 78 has a looped end portion 80 received over a mounting pin 82 between a head portion 84 of the mounting pin and a spacer washer 86 mounted on the pin 82. The mounting pin 82 is received through a suitable opening through the mounting plate 34 and swaged therein at 88. The friction force of the friction wire 78 against the pivot pin 54 serves to apply a small fixed frictional torque to the demand pointer 28 and provides a margin of safety if the demand pointer becomes unbalanced during operation.

Having described the elements comprising the maximum demand indicator means 26, its operation will now be briefly described. Movement of the pusher pointer 20 in response to varying electrical loads connected across the demand meter 10 such that the pusher pointer indicates the average electrical load on the graduated indicating scale 22 is well known and will not be described herein. Movement of the pusher pointer 20 along the scale 22 in the direction of increasing electrical loads will effect movement of the demand pointer 28 in the direction of increasing load whenever the pusher pointer 20 reaches a position wherein its push tab 32 engages the demand pointer 20. This will happen whenever the pusher pointer 20 is moved to a position indicating a load of greater magnitude than any load previously measured by the thermal demand meter during the measuring or metering period. Reduction in the electrical load being measured will cause the pusher pointer 20 to move backward along the scale 22, leaving the maximum demand pointer 28 at the position corresponding to the maximum electric load measured. Movement of the pusher pointer 20 responsive to the thermal measuring element 12 is relatively slow so that when the tab 32 engages the maximum demand pointer 28, the demand pointer will be moved slowly under low torque with low resistance to such movement from the damping clutch 30. As noted above, the damping compound 76 within the enclosed chamber in the mounting plate 34 maintains the maximum demand pointer 28 in its highest indicating position after the pusher pointer 20 has descended to a position indicating a reduced momentary electrical load across the meter. The damping compound 76 acts on the clutch disc 66 and prevents movement of the maximum demand pointer 28 when the demand pointer is subjected to sudden extraneous vibration or shock forces which would otherwise tend to move the maximum demand pointer. The desirable damping characteristics of my damping clutch assembly means 30 are substantially independent of the particular formulation of the damping compound 76, allowing the damping compound to be selected for its damping properties without imposing other restrictive requirements. By enclosing the chamber surrounding the clutch disc, a damping compound can be selected which will perform well in the damping clutch through the life of the demand meter.

While I have described my maximum demand indicator means 26 as being utilized in conjunction with a thermal demand meter 10, it will be understood that the basic concepts of my invention may be utilized on other devices wherein a damping clutch is desired to prevent undesirable movement of an indicator or other means when subjected to sudden shock or vibration forces, but which clutch will allow free movement of the indicator when subjected to normal low torque forces. Thus, while I have described a preferred embodiment of my invention, it will be understood by those skilled in the art that modifications and variations may be made therein without departing from my invention in its broader aspects.

I claim:

1. A demand meter comprising a frame, first indicator means supported by said frame and responsive to an electric load connected across the meter for measuring the electric load, and maximum demand indicator means including a housing means fixedly supported by said frame, said fixed housing means having a stationary, closed chamber for containing a damping compound therein comprising a first bore in said fixed housing means, a second larger bore concentric with said first bore, and a cover plate for said first bore, the outer perihery of which fits in sealed relation within the walls of the recess defined by said second bore to seal the chamber after the introduction of the damping compound into said chamber, a pivot pin extending through said stationary chamber and rotatably supported in bearing apertures located in said cover plate and an opposing side wall of said stationary chamber, said bearing apertures having minimum clearance with said pivot pin to allow rotation of said pivot pin while yet providing an otherwise closed chamber, pointer means secured to said pivot pin outside said stationary chamber and in spaced relation with said chamber, said pointer means being cooperable with said first indicator means so that said pointer means is moved with said pivot pin in response to the maximum electric load measured, disc means secured to said pivot pin for rotary movement therewith, said disc means being received within said closed chamber and having opposite side surfaces spaced from the inner wall surfaces of said closed chamber, said damping compound which is confined within said closed chamber thereby contacting said opposite side surfaces of said disc means.

2. A demand meter as defined in claim 1 including friction means supported by said housing and engaging said pivot pin to provide an additional force retarding movement of the pointer.

3. A demand meter as defined in claim 1 in which said pointer means comprises only means secured to said pivot pin exteriorly of said stationary closed chamber.

* * * * *